UNITED STATES PATENT OFFICE.

STEPHEN F. SPAULDING, OF JERICHO, CONNECTICUT.

IMPROVEMENT IN PREPARING VENEERS FOR BUTTER-BOXES.

Specification forming part of Letters Patent No. 164,945, dated June 29, 1875; application filed September 8, 1874.

*To all whom it may concern:*

Be it known that I, STEPHEN F. SPAULDING, of Jericho, in the county of Windham and State of Connecticut, have invented an Improved Mode of Preparing Veneers or Thin Pieces of Wood for Making Butter-Boxes, of which the following is a specification:

The chief object of my invention is to prevent butter, when packed for market, from acquiring a disagreeable taste from the firkin or wood in which it is packed; and to accomplish this object I propose to make butter-boxes of veneers, which have been chemically treated or prepared before the pieces of the box are nailed together. This chemical treatment is intended to close the pores of the wood, and destroy, neutralize or harden, and render tasteless and inert all the gummy and extractive matters of the wood. It consists of boiling or steaming the wood in brine or other equivalent chemical treatment in order to produce the effect desired.

In order to enable others to use my invention, I now proceed to describe the method in which I prefer to prepare veneers or the pieces of wood intended afterward to be nailed together, and thus make boxes for packing butter.

The veneers, being first dressed and cut to the desired length for making butter-boxes, are boiled in brine until the heat and salt strike completely through the wood, and thus close or tighten the pores of the wood, and also destroy, neutralize, or harden the gummy and extractive matters, and completely dissolve away all matter that might otherwise be liable to be dissolved, either by the butter or by the salt, buttermilk, or trace of other ingredient contained in or mixed with the butter, as usually packed for market.

Every dairyman will appreciate the importance of this mode of preparing the stuff for boxes before the pieces are nailed together, as the veneers may thus be closely packed in the boiler and conveniently handled, while it would be very difficult to chemically treat the boxes or firkins when finished on account of their great bulk.

I prefer to use veneers on several accounts. In the first place they are thin, and consequently are more easily treated chemically. In the second place a very thin layer of wood comes in contact with the butter, and this thin layer of wood can originally contain very little matter offensive to the taste; and after chemical treatment, if a trace of such matter remain, it will be imperceptible. In the third place, veneers are light for transportation, and also easily cleansed for second use, if desired; also, the packages of butter take less room in railroad cars or vessels when put up in boxes instead of firkins.

I may mention that the end pieces of the veneer boxes must be thick enough to hold the nails by which the pieces of a box are to be fastened together; also, these veneer boxes require to be set in a curb while being filled with butter, and afterward to be packed in an outer box, as is more fully explained in a patent just granted to me by the United States. Of course my chemical treatment of wood for butter-boxes may be applied to the staves, &c., of butter-firkins before the staves are set together and hooped; but I prefer to use veneer boxes for the reasons above mentioned.

Having described my invention I claim—

The process of treating wooden butter-boxes to remove any extractive matter which would affect the taste of the butter, said process consisting of boiling the wood in brine, substantially in the manner and for the purposes set forth.

STEPHEN F. SPAULDING.

Witnesses:
 DANIEL BREED,
 CHAS. OSGOOD.